United States Patent
Landeweer

(10) Patent No.: US 9,657,254 B1
(45) Date of Patent: May 23, 2017

(54) PAINT, INK AND RESIN REMOVER COMPOSITION

(71) Applicant: Kim Landeweer, Stuart, FL (US)

(72) Inventor: Kim Landeweer, Stuart, FL (US)

( * ) Notice: Subject to any disclaimer, the term of this patent is extended or adjusted under 35 U.S.C. 154(b) by 0 days.

(21) Appl. No.: 14/982,076

(22) Filed: Dec. 29, 2015

(51) Int. Cl.
| | |
|---|---|
| *C11D 1/72* | (2006.01) |
| *C11D 1/825* | (2006.01) |
| *C11D 3/22* | (2006.01) |
| *B08B 3/04* | (2006.01) |
| *C11D 3/04* | (2006.01) |
| *C11D 3/20* | (2006.01) |

(52) U.S. Cl.
CPC ............ *C11D 1/8255* (2013.01); *C11D 3/044* (2013.01); *C11D 3/2086* (2013.01)

(58) Field of Classification Search
CPC ........... C11D 1/72; C11D 1/825; C11D 3/042; C11D 3/044; C11D 3/22; B08B 3/04
See application file for complete search history.

(56) References Cited

U.S. PATENT DOCUMENTS

| | | | | |
|---|---|---|---|---|
| 5,271,860 | A * | 12/1993 | Schwadtke ............ | C11D 10/04 252/186.29 |
| 6,162,774 | A * | 12/2000 | Charlton ................ | A61K 8/362 424/70.19 |
| 6,716,901 | B2 | 4/2004 | Landeweer et al. | |
| 8,933,005 | B2 | 1/2015 | Slade et al. | |

FOREIGN PATENT DOCUMENTS

| | | |
|---|---|---|
| EP | 1247591 | 9/2002 |
| WO | WO 02/50195 | 6/2002 |

OTHER PUBLICATIONS

AkzoNobel, Material Safety Data Sheet, AG 6202 MSDS# 8003954, Feb. 21, 2014, 5 pages.
AkzoNobel, Safety Data Sheet, AG 6210, Version 2, Oct. 10, 2013, 12 pages.
Hill Chemical, Inc., Safety Data Sheet, RTS-Black, SDS #JC-022-005, Revision Jul. 23, 2015, 8 pages.

\* cited by examiner

*Primary Examiner* — Brian P Mruk
(74) *Attorney, Agent, or Firm* — Robert C. Kain, Jr.

(57) ABSTRACT

A composition for removing paint, ink or resin from an article comprising a first alkyl glycoside surfactant, a second alkyl glycoside surfactant, sodium hydroxide, and citric acid. Optionally, the sodium hydroxide and citric acid may be replaced by sodium citrate. Alternatively, the composition comprises an alkyl glycoside surfactant, an alkyl polyethylene glycol ether surfactant and a sodium citrate. The composition rapidly and efficiently removes paint, ink and resin from brushes, rollers, tools and equipment by dispersing the paint, ink and resin and has very limited environmental impact. The removed paint, ink or resin sediments and collects on the bottom of the container. The sedimentation can be sped up with the addition of a flocculent. The top layer of the solution may be removed and reused, while the bottom paint, ink or resin layer can be dried and disposed of as solid waste.

18 Claims, No Drawings

PAINT, INK AND RESIN REMOVER COMPOSITION

This is a regular patent application titled Paint, Ink, and Resin Remover Composition.

The present invention relates to a composition that rapidly and effectively removes paint, ink or resin from brushes, rollers, tools, equipment and a variety of other articles, while having low toxicity and being environmentally friendly. The composition significantly reduces the amount of paint, ink or resin that gets into our waste and ground water while cleaning brushes, rollers and other equipment in running water over a sink or soil.

BACKGROUND OF THE INVENTION

Most paint, ink and resin removers or brush cleaners contain solvents that are harmful to the environment and users. Solvents in paint removers or brush cleaners can include acetone, hydrocarbons, toluene, benzene, mineral spirits and turpentine. When solvents or copious amounts of water are used to clean a brush, roller or other tool, the harmful solvents or contaminated water more than likely to end up in the community's waste or ground water along with the removed paint. Both the solvents and removed paint are harmful to the environment and efforts should be made to reduce if not eliminate the disposal of these elements into the environment.

The composition of the invention can provide a huge environmental improvement over the current practice of using solvents, dishwashing soap and/or lots of water over the sink or outside over the soil to clean brushes or rollers. Many paint related chemicals find their way into water treatment plants or into the groundwater through septic-tanks or leach fields when brushes or tools are cleaned over a sink or outside over the ground. It takes gallons and gallons of water to clean paint from a brush or article. It is not safe to have these paint related chemicals in the water supply and environment. However, when the composition of the invention is used, enormous amounts of paint and solvents are prevented from entering the Earth's water supply and environment.

OBJECTS OF THE INVENTION

It is an object of the present invention to provide a solution that removes paint and other adhering substances such as ink and resins from brushes, rollers, tools and equipment with low toxicity and high efficacy. It is also an object of the invention to provide a composition and method that efficiently cleans brushes, rollers, tools and equipment saving significant amounts of time with very little human manipulation and which significantly reduces the amount of paint and chemicals entering the environment through the water supply.

It is a further object of the present invention to provide a solution that does not contain solvent for removing paint, resin and ink. It is desired to produce a paint, resin and ink remover and brush cleaner that rapidly and efficiently removes latex paint, resin and ink without a solvent. It is desired to provide a paint, ink and resin remover that disperses paint, but does not dissolve it. It is also desired to produce a paint remover for oil based paints that contains no or very little solvent.

It is a further object of the present invention to provide a process for cleaning brushes, rollers, tools, equipment or other articles containing paint, resin or ink with a composition containing surfactants, sodium citrate and water in an aqueous solution. The solution disperses the paint, resin and ink and is therefore separable from the residual waste, so that the solution may be poured off and reused or disposed of safely. The dispersed waste on the bottom of the solution can then be dried and discarded as solid waste. This eliminates toxic elements from entering our waste or ground water as a result of brushes, tools or other articles being cleaned under running water in a sink or outside over soil.

SUMMARY OF THE INVENTION

A composition for removing paint, resin and ink comprising an aqueous solution of a first alkyl glycoside surfactant, a second alkyl glycoside surfactant, sodium hydroxide, and citric acid. Optionally, the composition may include a first alkyl glycoside surfactant, a second alkyl glycoside surfactant, and sodium citrate. In another embodiment, the composition may comprise an alkyl glycoside surfactant, an alkyl polyethylene glycol ether surfactant and a sodium citrate. The composition has low toxicity and high efficacy in removing paint, resin and ink. The composition has a relatively neutral pH and is environmentally friendly. The solution disperses paint, resin, ink and other similarly adhering substances. In some embodiments, the composition may further include a small amount of solvent for removal of hard to remove, oil based paint.

The process for removing paint, ink or resin from an article, comprising submerging the article in a solution for a few seconds to several minutes while gently agitating the article in the solution, wherein the solution is an aqueous solution comprising effective amounts of at least two surfactants, sodium citrate and water. The surfactants may be a combination of a first and second alkyl glycoside, wherein the first alkyl glycoside is different from the second alkyl glycoside, or a combination of an alkyl glycoside surfactant and an alkyl polyethylene glycol ether surfactant. Prior to use the composition is diluted with water, typically at a 1:5 dilution. After the solution has had sufficient time to penetrate the paint, ink or resin, the article can be lifted out of the solution in order for the waste to be rinsed off with a small volume of clean water over a container. The waste, which is dispersed paint, ink or resin, will naturally sediment to the bottom of the container. This may take a few hours to several days depending on waste particle size and specific gravity. To speed-up the sedimentation, a flocculent may be added to the solution. The flocculent will quickly sediment removed waste to the bottom of the solution so that the top composition layer of the aqueous solution may be poured off and reused or properly disposed of, while the bottom paint layer may be left to dry and be disposed of as solid waste. Without the addition of flocculent, the paint, ink or resin will naturally sediment to the bottom of the container within a few hours to several days depending on the specific gravity and dispersed particle size.

DETAILED DESCRIPTION OF THE PREFERRED EMBODIMENTS

The composition is intended to be used to remove paint, ink, resins and/or polymers from the article onto which it is adhered, such as paintbrushes, rollers, tools and equipment. The composition comprises sodium hydroxide, citric acid, two surfactant agents and water. The composition is intended to be sold in a concentrated form. The user may dilute the composition. The dilution ratio may vary depending upon the waste content, volume of waste to be removed, efficacy of the composition for a particular waste, and the desired results. The typical dilution is at a ratio of about 1:5. Herein the term "waste" shall include the paint, ink or resin to be removed or dispersed from an article. Ideally the diluted solution will be put in a container of sufficient size to hold the brush, roller or article intended to be cleaned such that the area of the brush, roller or tool containing or covered with the paint, ink or resin is fully submerged in the solution. The object will be submerged within the solution and agitated. Paint, ink or resin particles will start dispersing from the tool or object when it is placed in the solution. The waste can then be rinsed from the tool or object into a container. The removed paint, ink or resin will naturally settle and collect at the bottom of the container. A flocculent can be added to increase sedimentation of particles to the bottom of the container. After the tool or object is removed, the unused or clean solution above the waste or paint at the bottom can be poured off and reused or otherwise properly disposed of. The top layer of solution will be relatively free of toxic chemicals and the waste or paint on the bottom can be dried and disposed of as solid waste. When cleaning paint from brushes or rollers, after soaking, the brushes and/or rollers are removed from the solution, then rinsed in water. A waste bucket can be used to collect any remaining paint while rinsing with water. A flocculent may be added to the waste water to sediment the remaining paint for solid waste disposal while the top clean layer may be disposed of in the sink.

The composition is composed of two or more surfactants, or surface-active agents, which are substances such as a detergent that, when added to a liquid, reduces its surface tension, thereby increasing its spreading and wetting properties. The surface-active molecule must be partly hydrophilic (water-soluble) and partly lipophilic (soluble in lipids, or oils). It concentrates at the interfaces between bodies or droplets of water and those of oil, or lipids, to act as an emulsifying agent, or foaming agent. The hydrophobe is usually the equivalent of an 8 to 18 carbon hydrocarbon, and can be aliphatic, aromatic, or a mixture of both. The sources of hydrophobes are normally natural fats and oils, petroleum fractions, relatively short synthetic polymers, or relatively high molecular weight synthetic alcohols. The hydrophilic groups give the primary classification to surfactants, and are anionic, cationic and nonionic in nature. The nonionic hydrophiles associate with water at the ether oxygens of a polyethylene glycol chain.

The composition or solution may be sold in conjunction with a flocculent. Flocculents, or flocculating agents (also known as flocking agents), are chemicals that promote flocculation by causing colloids and other suspended particles in liquids to aggregate, forming a flock. Flocculents are used to improve the sedimentation of small particles, in this instance, paint. The flocculent can be added to the brush cleaner solution once the cleaning is done to assist in sedimenting paint to the bottom of the container, so that the brush cleaner solution may be reused or properly disposed of. The flocculent may also be added to waste water that accumulates after rinsing in order to sediment any remaining paint particles in the waste water. Then the clean top layer of water may be poured down the drain, while the bottom paint layer may be left to dry and then disposed of with solid waste.

The composition will preferably be composed of 1-5% sodium hydroxide, 1-7% citric acid, 2-8% surfactant A and 2-8% surfactant B. In the preferred formula, the composition begins with 400 L of water. Added to the water is 25 kg of sodium hydroxide, 30 kg of citric acid, 50 liters of surfactant A and 50 liters of surfactant B. The solution is then brought up to a total volume of 1000 liters. The composition thus comprising approximately 94% to 72% by weight water. Sodium hydroxide (NaOH), also known as caustic soda, is a highly caustic substance that is used to neutralize acids and make sodium salts. Citric acid is a weak organic acid used as a acidifier. Citric acid ($C_6H_8O_7$) can be used to soften water in soaps and laundry detergents. Citric acid chelates metals in hard water allowing cleaners to produce foam and work better without need for water softening. Surfactant A is preferably a low foaming, non-ionic alkyl glucoside based on a short chain fatty alcohol and glucose. Surfactant B is preferably a non-ionic alkyl glucoside based on a blend of short chain fatty alcohols and glucose. In the preferred embodiment, surfactant A is AG™6202 manufactured by AkzoNobel and surfactant B is AG™6210 manufactured by AkzoNobel. (AG is a trademark of Akzo Nobel Global.) However, similar known surfactants can be used in the solution to achieve the same results.

The composition can be used directly, but for most applications it is preferably diluted with water by a consumer in order to remove water based, latex paints and oilseed paints, ink, or resins from brushes, rollers other tools and surfaces and equipment. The composition can also be used to remove dried paint, ink and resin from tools and fabric by allowing the affected tools or fabrics to soak until the waste peels off.

When using the composition, a container is filled with water and the composition is diluted into the water. The dilution is typically at a 1:5 ratio. The water is preferably warm or hot in temperature. The oil or latex-paint covered brushes, rollers or tools are soaked for a few seconds in the diluted aqueous solution. The brush, roller or tool can be gently swished and agitated in the container in order to allow the cleaner to penetrate all bristles of the brush or areas of the roller. Then the brush, roller or tool is removed and rinsed in water.

When the diluted solution is not disturbed over time, the paint, ink or resin particles in the diluted solution will naturally settle to the bottom of the container as sediment, leaving a clear liquid mixture on top containing diluted solution. Optionally, a flocculent can be added to increase the sedimentation rate of the paint or waste. The diluted solution can be reused several times before disposal. The diluted solution can be poured off of the waste or paint sediment layer, so that the solution can be reused. The waste or paint sediment layer can then be dried and disposed of with solid waste. The use of the composition can drastically reduce paint waste getting into the environment. It has been estimated that approximately 250 Olympic size swimming pools of domestic paint is being washed into the sewer system yearly merely from cleaning brushes and paint tools and trays in sinks.

After the brush, roller or tool is soaked and cleaned in the diluted brush cleaner solution, the brush, roller or tool is then transferred to a water tap with a bucket underneath to catch the waste water. Only a small amount of fresh tap water needs to be used to rinse the diluted solution and any remaining paint, ink or resin out of the brush, roller or tool and into the bucket. Then the waste water can be either: (1) dropped off at a chemical waste collection point, or (2) allowed time to settle or a little flocculent can be added to collect all remaining paint, ink or resin at the bottom of the bucket and the clean water on top can be reused or properly disposed of or (3) if the waste water is set aside for a few days, the paint or waste will naturally collect at the bottom at which time the clean water on top may be disposed of in the sink. The concentrated pigment left in the container can dry in the container or bucket and then be disposed of with other solids in the regular garbage. Another method of getting the paint, ink or resin concentrate to solidify quickly is by adding a drying agent and mixing it in with the paint, ink or resin residue. This quickly produces dry waste.

A variant of the composition can include an alternate surfactant. The composition begins with 400 L of water. Added to the water is 25 kg of sodium hydroxide, 30 kg of citric acid, 50 liters of surfactant A and 50 liters of surfactant B. The solution is then brought up to a total volume of 1000 liters. In this embodiment, surfactant A is AG™6202 manufactured by AkzoNobel and surfactant B is Lutensol® XL 70 manufactured by BASF. (LUTENSOL is a registered trademark of BASF Aktiengesellschaft.) Lutensol® XL 70 is an alkyl polyethylene glycol ether made from a C10-Guerbet alcohol and alkylene oxides. Although specific surfactants are identified, any like surfactant may be substituted for a specifically identified chemical.

In another variant of the composition, citric acid and sodium hydroxide are replaced by sodium citrate. Sodium citrate is a premixed blend of citric acid and sodium hydroxide. The use of sodium citrate ($C_6H_5O_7Na_3$) can speed up the blending since less time is lost cooling the mixture.

Dibasic esters may optionally be added to the composition. When dibasic esters are added at a percentage greater than 3% of the total volume, then the cleaning power increases relative to the amount of dibasic ester added. Due to environmental concerns, dibasic esters will only be added when enhanced cleaning power is required, for example when the brush cleaner formula is to be used to wash strong oil based paints from tools or brushes. Dibasic ester-6 ("DBE-6") and dibasic ester-9 ("DBE-9") are optional dibasic esters that will work in the composition. DBE-6 is a dimethyl adipate and DBE-9 is a mixture of dimethyl glutarate and dimethyl succinate. The resulting brush cleaner formula would be sold as a stronger formula, typically for use with oil based paints.

Ideally, the container to be used with the composition or solution is sized to be the approximate size of the article to be cleaned. A cylindrical container, like an elongated tennis ball container can be used to clean rollers. The appropriate sized container provides the benefit of using only the necessary amount of composition or solution to clean the article. For example, only a little amount of fluid would need to be placed in a cylindrical container with the roller. Once the container is sealed, it can be shaken for five to thirty seconds which would serve to ensure contact of the solution on all areas of the roller. Within the five to thirty seconds, the paint will be removed from the roller. The roller would only need to be quickly rinsed with a few cups of water after it is removed from the solution, then it can be dried and stored or used.

Example 1

The composition begins with 400 L of water. Added to the water is 25 kg of sodium hydroxide, 30 kg of citric acid, 50 liters of surfactant A (AG™6202) and 50 liters of surfactant B (AG™6210). The solution is then brought up to a total volume of 1000 liters. This results in the composition that is bottled for a consumer.

The composition was then diluted in water at a ratio of 1:5. A container was filled with 5 ounces of solution and 25 ounces of warm water was added to the solution. A paint brush that had been used for painting interior walls in a house with latex paint was desired to be cleaned. The wet latex-paint covered brush was soaked for a 30 seconds in the diluted solution. The paint fell from the brush with minor agitation or swirling. After soaking in the diluted solution for one to three minutes, the brush was removed from the diluted solution and rinsed under the faucet for a few seconds with a waste container under the brush to catch any remaining paint.

The diluted solution was set aside to be re-used. Within the next 48 hours, the paint in the diluted solution fell to the bottom of the container and collected there. The top layer of diluted solution was poured off into a container to be used again for removing paint. The collected paint on the bottom of the container was left to harden and was then disposed of in the solid waste.

The waste container used to collect the minimal amount of paint left in the brush when the brush was rinsed, was also set aside. A small amount of flocculant was added to the waste container. After 15-30 minutes, any paint residue in the waste water had collected on the bottom of the waste container. The top layer was then drained off and poured down the sink. The bottom paint layer was left to dry for 48 hours, at which time it was removed from the waste container and disposed of with the solid waste.

Example 2

A test was conducted to determine the effectiveness of the composition as compared to the use of water to clean a brush with dried or cured latex paint. To begin, two paint brushes were used to paint with interior wall latex paint and left to dry over night. The composition was composed of the following active ingredients: AG™6202, AG™6210, and sodium citrate. One brush (herein "Brush 1") was submerged in the brush cleaner composition that was diluted at a ratio of 1:5, one part brush cleaner formula to five parts of warm water. The second brush (herein "Brush 2") was submerged in water. Both brushes were soaked in the respective solutions for 45 minutes. After 45 minutes of soaking, the brush cleaner solution of the invention took on the color of the orange paint from Brush 1. Paint residue had settled to the bottom of the container. The water holding Brush 2 had taken on a slightly orange color tint from the paint.

After 30 seconds of agitating Brush 1 back and forth in the solution, the paint began to further loosen from the head of the bristles down to the ferrule of Brush 1. After 30 seconds of agitating Brush 2 back and forth in the water, no changes occurred.

Within three minute of cleaning Brush 1, approximately 70% of the paint on Brush 1 had been lifted off the brush and collected on the bottom of the container. The bristles began to resemble its original color. Within three minute of cleaning Brush 2, approximately 20% of the paint on Brush 2 had been lifted off the brush. Paint remained cured on the bristles.

After two additional minutes of cleaning using fingers to remove the dried paint from the ferrule, the bristles of Brush 1 were clean, soft and ready to be used again. Brush 1 was rinsed quickly with water and dried. After one minute of attempting to remove the dried paint from the bristles of Brush 2 using fingers, Brush 2 had to be soaked again as the dried paint was not yet removable even with manipulation. Brush 2 could not be completely cleaned nor the dried paint removed with water alone. There was a significant advantage over use of the composition when cleaning a latex coated paint brush.

Example 3

A test was conducted to determine the effectiveness of the composition on oil based paint. The composition was composed of the following active ingredients: AG™6202, AG™6210, and sodium citrate. The brush with wet oil based paint was submerged in the brush cleaner formula of the invention diluted at a ratio of 1:5, one part brush cleaner composition to five parts of warm water. Within one minute of the brush being soaked in the brush cleaner solution, the solution took on the color of the white paint. After thirty sections of agitating the brush back and forth in the solution, the paint was mostly gone from the head of the bristles down to the ferrule. Within three minutes of cleaning the brush, approximately 90% of the paint was lifted from the brush. The bristles began to resemble its original color. After an additional minute of cleaning the brush with fingers to remove dried paint from the ferrule, the bristles were clean, soft and ready for re-use. No paint was left in the bristles of the brush. A scrubber was used to remove paint stains near the ferrule of the brush. The brush was then rinsed quickly with water and dried.

It is understood that the paint, ink and resin remover composition may be used to remove paint, ink, resin, make-up and other adhering substances, which are difficult to remove from an article without departing from the spirit of the invention. The paint, ink and resin remover composition can remove paint, ink, resin, make-up and other adhering substances from not only brushes, but also rollers, tools, equipment, clothing and other surfaces or articles to which the paint, ink, make-up or other adhering substances are adhered. For example, the article to be cleaned can include spray painting equipment, printing machines, resin covered brushes and rollers, ink rollers, silk screen equipment, paint scrapers, and make-up brushes and applicators.

The claims appended hereto are meant to cover modifications and changes within the scope and spirit of the present invention.

What is claimed is:

1. A composition for removing paint, ink or resin from an article comprising an aqueous solution of:
    2% to 8% by weight of a first alkyl glycoside surfactant;
    2% to 8% by weight of a second alkyl glycoside surfactant, which differs from the first alkyl glycoside surfactant;
    1% to 5% by weight of a sodium hydroxide; and
    1% to 7% by weight of a citric acid.

2. The composition of claim 1, further comprising a dibasic ester.

3. The composition of claim 1, further comprising 94% to 72% by weight water.

4. A composition for removing paint, ink or resin from an article comprising an aqueous solution of:
    2% to 8% by weight of a first alkyl glycoside surfactant;
    2% to 8% by weight of a second alkyl glycoside surfactant, which differs from the first alkyl glycoside surfactant; and
    2% to 12% by weight of a sodium citrate.

5. The composition as claimed in claim 4, further comprising a dibasic ester.

6. The composition of claim 4, further comprising 94% to 72% by weight water.

7. A composition for removing paint, ink or resin from an article comprising an aqueous solution of:
    2% to 8% by weight of an alkyl glycoside surfactant,
    2% to 8% by weight of an alkyl polyethylene glycol ether surfactant; and
    2% to 12% by weight of a sodium citrate.

8. The composition as claimed in claim 7, further comprising a dibasic ester.

9. The composition of claim 7, further comprising 94% to 72% by weight water.

10. A process for removing paint, ink or resin from an article, comprising: submerging the article in a solution for thirty seconds to three minutes and agitating the article in the solution, wherein the solution is an aqueous solution comprising effective amounts of at least two surfactants and sodium citrate, and wherein prior to use the solution is diluted 1:5 with water;
    wherein the solution comprises 2% to 8% by weight of a first alkyl glycoside, 2% to 8% by weight of a second alkyl glycoside, and 2% to 12% by weight sodium citrate.

11. The process of claim 10, wherein the first alkyl glycoside surfactant is different than the second alkyl glycoside.

12. A process for removing paint, ink or resin from an article, comprising: submerging the article in a solution for thirty seconds to three minutes and agitating the article in the solution, wherein the solution is an aqueous solution comprising effective amounts of at least two surfactants and sodium citrate, and wherein prior to use the solution is diluted 1:5 with water; and wherein the solution includes a diabasic ester.

13. The process of claim 12, wherein the surfactants are an alkyl glycoside and an alkyl polyethylene glycol ether.

14. The process of claim 13, wherein the solution comprises 2% to 8% by weight of the alkyl glycoside surfactant, 2% to 8% by weight of the alkyl polyethylene glycol ether surfactant, and 2% to 12% by weight of the sodium citrate.

15. The process as claimed in claim 10, wherein the solution further includes a diabasic ester.

16. The process as claimed in claim 10, further comprising removing the article from the solution and rinsing it in water.

17. The process as claimed in claim 10, further comprising adding a flocculent to the solution after the article has been removed to quickly sediment removed paint, ink or resin waste to the bottom of the solution so that a top layer of the solution may be poured off and reused or disposed of, while a bottom paint, ink or resin waste layer may be dried and disposed.

18. The process as claimed in claim 16, further comprising adding a flocculent to the waste water produced from rising the article to sediment any remaining paint, ink or resin to the bottom of the waste water and so that a top layer of water may be poured off and disposed of, while a bottom paint, ink or resin waste layer may be dried and disposed.

* * * * *